Sept. 8, 1970  J. W. DASHNER  3,527,483

TAPPING SLEEVES

Original Filed July 11, 1966  12 Sheets-Sheet 1

INVENTOR.
JAMES WILLIAM DASHNER
BY
David D. McKenney
ATTORNEY

INVENTOR.
JAMES WILLIAM DASHNER
BY
David D. McKenney
ATTORNEY

Sept. 8, 1970   J. W. DASHNER   3,527,483
TAPPING SLEEVES

Original Filed July 11, 1966   12 Sheets-Sheet 3

INVENTOR
JAMES WILLIAM DASHNER
BY
David D. McKenney
ATTORNEY

Sept. 8, 1970 J. W. DASHNER 3,527,483
TAPPING SLEEVES
Original Filed July 11, 1966 12 Sheets-Sheet 4

INVENTOR.
JAMES WILLIAM DASHNER
BY
David D. McKenney
ATTORNEY

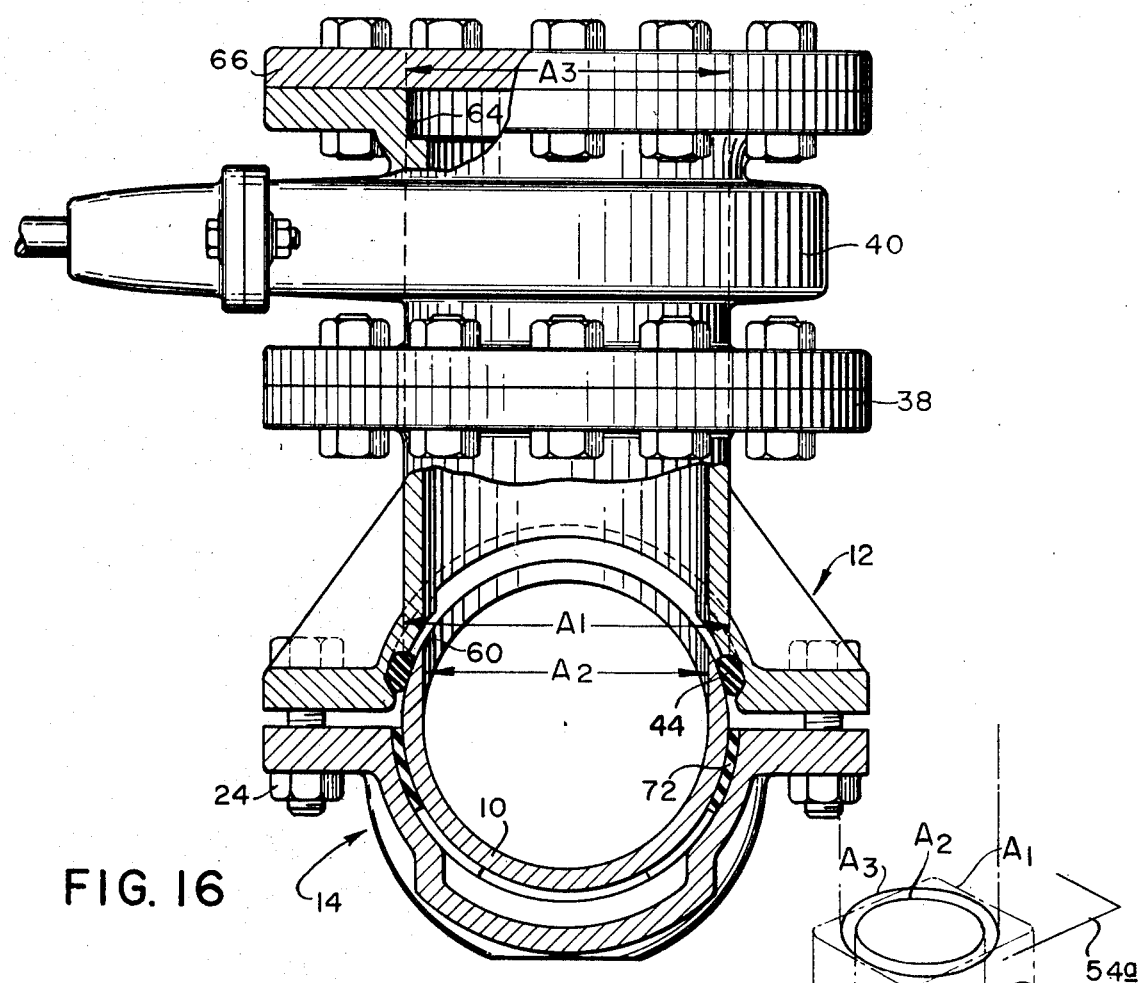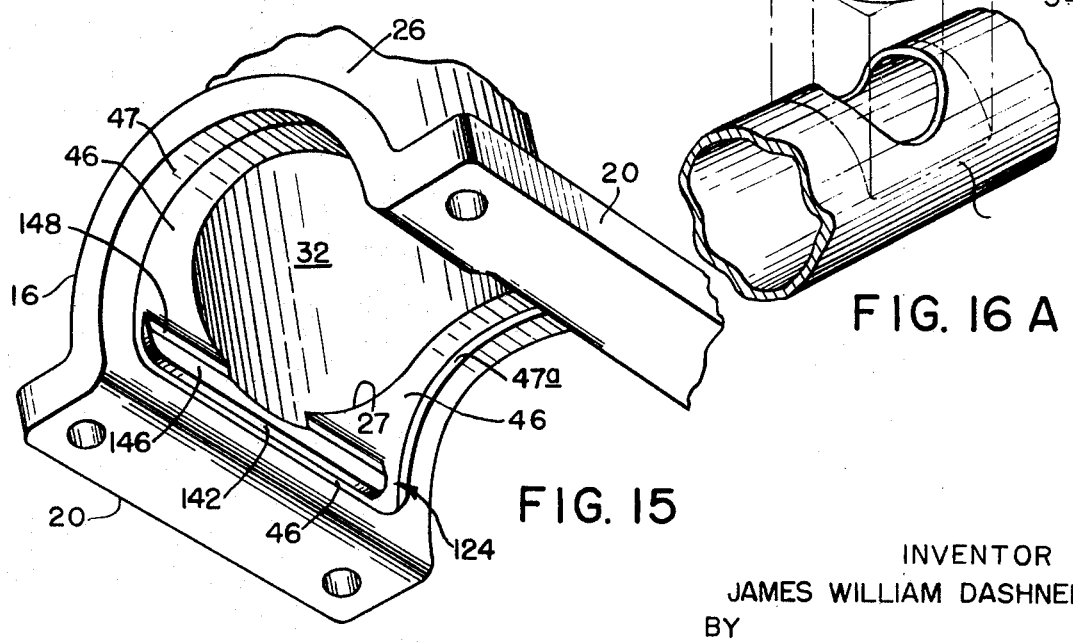

Sept. 8, 1970     J. W. DASHNER     3,527,483

TAPPING SLEEVES

Original Filed July 11, 1966     12 Sheets-Sheet 8

INVENTOR
JAMES WILLIAM DASHNER
BY

ATTORNEY

Sept. 8, 1970   J. W. DASHNER   3,527,483
TAPPING SLEEVES
Original Filed July 11, 1966   12 Sheets-Sheet 11

INVENTOR.
JAMES WILLIAM DASHNER
BY
David D. McKenney
ATTORNEY

Sept. 8, 1970  J. W. DASHNER  3,527,483
TAPPING SLEEVES
Original Filed July 11, 1966  12 Sheets-Sheet 12

INVENTOR.
JAMES WILLIAM DASHNER
BY
David D. McKenney
ATTORNEY

United States Patent Office 3,527,483
Patented Sept. 8, 1970

3,527,483
TAPPING SLEEVES
James William Dashner, Elmira, N.Y., assignor to Kennedy Valve Mfg. Co., Inc., Elmira, N.Y., a corporation of New York
Continuation of application Ser. No. 564,365, July 11, 1966. This application Sept. 30, 1968, Ser. No. 766,376
Int. Cl. F16l 5/00
U.S. Cl. 285—197       30 Claims

ABSTRACT OF THE DISCLOSURE

This specification discloses a tapping sleeve which can be attached on a pipe carrying fluid under pressure and which permits an opening to be cut in the pipe and the connection of a branch pipe thereto. The tapping sleeve comprises of a branch member, a back-up member and a single, continuous sealing ring which is positioned on a recess surface of the branch member and which surrounds an opening in the branch member. The sealing boundary which is formed between the sealing ring and the recessed surface is non-concentric with respect to the edge of the opening in the branch member, being positioned closely adjacent to the opening along its axial diameter and diverging therefrom. The back-up portion includes resilient pads which are positioned adjacent to opposite circumferential ends to engage circumferentially spaced portions of the pipe. A relieved area is provided between the pads.

CROSS REFERENCE TO OTHER APPLICATIONS

This application is a continuation application of my application Ser. No. 564,365, filed July 11, 1966, now abandoned.

When it is desired to provide a piece of installed pipe with a branch connection, and the removal of a complete pipe section for insertion of a regular T-fitting is not possible or practical, some form of tapping sleeve can be employed. In general each such sleeve is formed in two rigid halves which are clamped around the pipe and which, with a suitable gasket, seal off an area of the pipe surface where the branch opening is to be located. This opening is then cut through the pipe wall in registration with a passage in one of the fitting halves. The usual reason for using a tapping sleeve is that the pipe is already in service, carrying fluid under pressure, and it is not possible to isolate and drain the pipe section to which the branch must be connected. By mounting a valve on the tapping sleeve with certain special attachments the cutting tool can be completely enclosed in the tapping sleeve passage, can cut the hole and can be removed from the passage and dismounted from the valve without affecting the pressure in the pipe and without any significant escape of fluid therefrom. This valve and these attachments are well known in this art and form no part of this invention.

These fittings are called "tapping sleeves" because the passage in the upper sleeve half often has to have its outer end internally threaded to receive external threads found on the small branch pipes. For the large branch holes with which this invention is primarily concerned the branch pipe is usually of the bell-joint type, but it is conventional to refer to all of these devices as "tapping sleeves."

DESCRIPTION OF THE PRIOR ART

The prior art tapping sleeves have been difficult to install, particularly those of the type which seals off the area of the branch opening by completely encircling the pipe with seals on the upstream and downstream sides of the opening. Such seals have been formed either by pouring molten lead into special grooves in the sleeve halves or by the use of split gaskets tightened against the pipe by split glands. In either case installation has been a difficult and time-consuming process. Even the other general type of prior art sleeve, which has a single sealing member around the branch opening, presents installation problems, particularly where the branch opening is the same size as, or nearly the same size as, the pipe. This is because the force components squeezing this member at the branch opening low points are quite small even when the outside pipe diameter has the most ideal value. The usual variations in this diameter can make these components even smaller. The present invention makes a seal much easier to achieve in sleeves of this last-mentioned type and permits one sleeve size to accommodate an extensive range of pipe diameter variations.

With any of the prior art tapping sleeves the cutting of the branch opening weakens the pipe section circumferentially related thereto. The larger the branch opening the greater the weakening, and when the diameter of the branch opening is as large as, or nearly as large as, the inside diameter of the pipe itself so much of the pipe wall is cut away that unless special measures are taken in the sleeve design the fluid pressures which can thereafter be handled are significantly less than those which could be handled by the pipe before the opening was cut or by a regular T-fitting.

One such special measure is merely the use of the first-mentioned type of sleeve in which, the two halves cooperate to support multiple seals. By having these seals completely encircle the pipe on opposite sides of the branch opening, and by providing further seals between the two halves themselves, a chamber is formed entirely encompassing the outside of the weakened pipe section. Line pressure can enter this chamber and be exerted on the outside as well as the inside of every portion of this section. As a result all the pressure forces imposed on this weakened section are balanced and the pipe can withstand substantially the same pressures it could have withstood before the branch opening was cut. However, despite this advantageous feature multiple seal tapping sleeves have been difficult to use because of the complexity of their arrangements of preventing leakage.

In the other type of sleeve the single continuous seal which encompasses the branch opening must be supported entirely in the "upper" sleeve half. As a result the pressure acts only internally on substantial portions of the weakened section beyond the seal, and the weakened section is subjected to larged unbalanced pressure forces.

The geometry of the non-continuous pipe wall is especially bad for handling the unbalanced forces, and very large stresses have appeared, particularly at the branch opening high points.

In the prior art this stress condition has been aggravated by the fact that the portions of the weakened section which are beyond the seal (and on which only internal pressure acts) have included substantial areas opposite the upper sleeve half as well as the entire area opposite the lower sleeve half.

SUMMARY OF THE INVENTION

The present invention greatly improves this type of tapping sleeve by so arranging the seal that the portions of the weakened section which are exposed only to internal pressure are relatively smaller than ever before. The pressure forces acting on the weakened section are thus kept to a minimum and the pipe can withstand pressures significantly higher than those which have been withstood in the past by the corresponding prior art sleeve assemblies.

By far the most preferred embodiment of the invention is that in which the seal extends circumferentially from each branch opening high point down both sides of the weakened pipe section to about the edge of the upper sleeve half and then longitudinally across this section. Viewed along the branch opening axis this preferred seal configuration is generaly rectangular, and the portions of the weakened section on which only internal pressure is exerted are limited to substantially those not covered by the upper sleeve half.

The clamping of the sealing member against the outer pipe surface is achieved by slight movement of the upper tapping sleeve along the branch opening axis, for example by tightening of the nut and bolt assemblies which hold the two halves together. The component of this movement which is normal to the outside pipe surface, and thus useful for compressing the sealing member, is very small near the widest part of the pipe. Consequently with branch openings of appreciable size the prior art has attempted to minimize the chances of leakage by having the sealing member as close as possible to the branch opening. The present invention is directed away from this favoring location of as much of the sealing member as possible at a substantial distance below the level of the opening low points.

To a great extent this novel location of the sealing member can be accomplished because of a special sealing member retaining wall in the upper sleeve. By the particular shape of this wall and by the provision of ridges adjacent to it at certain locations, which are additional features of this invention, the longitudinally extending legs of the sealing member are squeezed and supported in an unusually effective way. Scrubbing action of the sealing member is prevented during clamping, and a continuous sealing boundary results even when these longitudinal legs are located just above the mid-plane of the pipe.

There are, in practice, significant variations in the outside diameters and roundness of pipes in service and lesser variations in the dimensions of the cast upper tapping sleeve. For example, many cast iron pipes which are still employed in municipal water and gas service, and on which tapping sleeves are still being installed, were made and installed long ago when the outside diameter in each nominal size was quite different than the outside diameter, in that size, today. It is, of course, very desirable to be able to apply a tapping sleeve of one size to all pipes of the same nominal size now in use. Surprisingly, the novel ridge surfaces of the present invention enable a tapping sleeve of one size to achieve a seal near the mid-plane despite these pipe variations.

Even when the branch opening is substantially smaller than the inside diameter of the pipe, and the weakening of the pipe is therefore less pronounced, by far the best results are still achieved by locating the longitudinal legs of the sealing member as near to the mid-plane as possible and across as much of the weakened section as possible. As in the size-for-size situation, this exposes as much of the weakened pipe section as possible to external pressure, and the force on this section, caused by the pressure acting only internally on the remainder thereof, is minimized.

It is also preferred that the circumferentially extending legs of the sealing member pass as close as possible to the high points of the branch opening. Although it would seen advantageous to follow the novel arrangement at the weakened section and apply external pressure forces to portions of the continuous pipe sections on either side of the branch opening, the gain to be had in this direction appears to be more than offset by the distortion of these adjacent continuous pipe sections by the resulting nonuniform force loads. Thus for each such portion of a continuous section which is enclosed by the seal there is a corresponding portion circumferentially related to it which remains exposed only to internal pressure. The result is that when the circumferential legs are spaced longitudinally away from the high points the pressure forces on the continuous sections become nonuniform in the sense that they are applied only part way around the pipe circumference, and although these continuous sections are themselves fully capable of withstanding the adverse effects of such non-uniform loading, they do distort as a result of it, and it appears that the addition of this distortion to that of the weakened section significantly increases the stresses at the points therein where failure almost always first occurs. Despite the above, however, it is within the scope of this invention to have some longitudinal spacing of the sealing member longitudinally from the high points of the branch opening, as long as this spacing is limited in a manner which will be explained.

Pipe deformation is further minimized and stresses in the weakened section are further decreased in the present invention by a unique cooperation between the above-described novel sealing member arrangement and a novel lower sleeve half. Thus, because of the variations in the pipe and tapping sleeve dimensions, the lower half of the tapping sleeve has had to be designed to fit around the pipe even upon the occurrence of the worst possible combination of such dimensions. The loose fit which therefore results in most cases is undesirable because it prevents the lower sleeve half from engaging the pipe sides and preventing their deformation.

I have discovered that the disadvantages of this loose fit can be overcome and the bulging of the pipe sides can be reduced by covering the inner surface of the lower fitting half with resilient pads of the proper thickness, particularly the edge portion of this surface near the mid-plane of the pipe, and by wedging these pads between the pipe and this surface edge portion.

Clamping the two fitting halves together will provide some of this wedging, and where branch pipe of the bell-joint type is used the provision of a sealing member encompassing an area greater than that of the branch pipe has the unexpected additional advantage of employing the line pressure to provide significant additional wedging. Thus, assume that the upper sleeve half is not supported by any structure other than the main pipe. This would be the case where the tapping sleeve has been clamped around the main pipe, the branch hole has been cut in the main pipe, the cutting equipment has been removed and the usual valve has been left mounted on the upper sleeve half, but no branch pipe has been connected. The internal pressure acting on both the upper sleeve half and valve cover an area at least as large as the branch opening and will endeavor to move the fitting half and valve away from the pipe along the branch axis. As a result the lower fitting half will be drawn firmly toward the underside of the pipe by the pressure forces, and the sides of the lower half wedge the resilient pads against the pipe.

On the other hand, the branch pipe which is later connected to the valve is often the bell-joint type so that the valve and sleeve are unable to provide any support for the pressure forces acting on the branch pipe and tending to drive it axially away from the main pipe. This force on the branch pipe is equal to the area encompassed by its outside diameter multiplied by the pressure, and movement of the branch pipe must be prevented by some other structure, for example by its being attached to building frames or buried in soil. Where the branch pipe is large and the sealing member has a prior art location close to the edge of the branch opening the upper fitting half area encompassed is about the same as the area encompassed by the branch pipe's outside diameter. Consequently there has been in these past cases no significant force tending to move the upper sleeve half away from the pipe. In the present invention, however, the area encompassed by the seal is substantially greater than the area encompassed by the branch pipe's outside diameter, and this differential results in considerable force urging the upper sleeve half away from the pipe and thereby drawing the lower sleeve half against the pipe in the desired manner. Wedging of the resilient pads is thus assured in all situations.

Even with the use of the resilient pads on the inner surface of the lower sleeve half and even with the employment of the fluid pressure to draw the lower sleeve half against the pipe in all situations, the bulging of the sides of the pipe is not effectively prevented if the lower sleeve half is not sufficiently rigid. It is a feature of the preferred embodiment of the present invention that the center of the lower sleeve half is recessed substantially with respect to the outer surface portions on which the resilient pads are located. For example, such recessing is preferably at least as great as the thickness of the lower sleeve half as measured at the outer surface portions.

By far the most preferred embodiment of the present invention employs the "rectangular" seal, as described, because it encompasses a maximum amount of the area of the weakened pipe section, but it will be understood that the precise shape of the seal is not critical. The benefits of the invention are enjoyed when the sealing boundary merely diverges from the opening as it extends from the high points thereof. Such divergence enables the sealing boundary to encompass a greater portion than ever before of the outer pipe surface area which is bounded by the branch opening, by the mid-plane and by circumferences drawn tangent to the high points of the opening.

The best modes in which it has been contemplated employing the principles of the present invention are shown in the accompanying drawings, but these are to be deemed primarily illustrative for it is intended that the patent shall cover by suitable expression in the appended claims whatever of patentable novelty exists in the invention disclosed.

In the drawings:

FIG. 15 is a perspective view of the upper sleeve half showing more of the surfaces for controlling the sealing member;

FIG. 16 is a view like FIG. 3, but showing the sleeve and valve assembly before a branch pipe is connected;

FIG. 16A is a diagrammatic perspective view showing the projections of the branch opening area, of the area encompassed by the sealing member and of the area encompassed by the branch pipe's outside diameter on a plane perpendicular to the branch axis;

Figure 1:
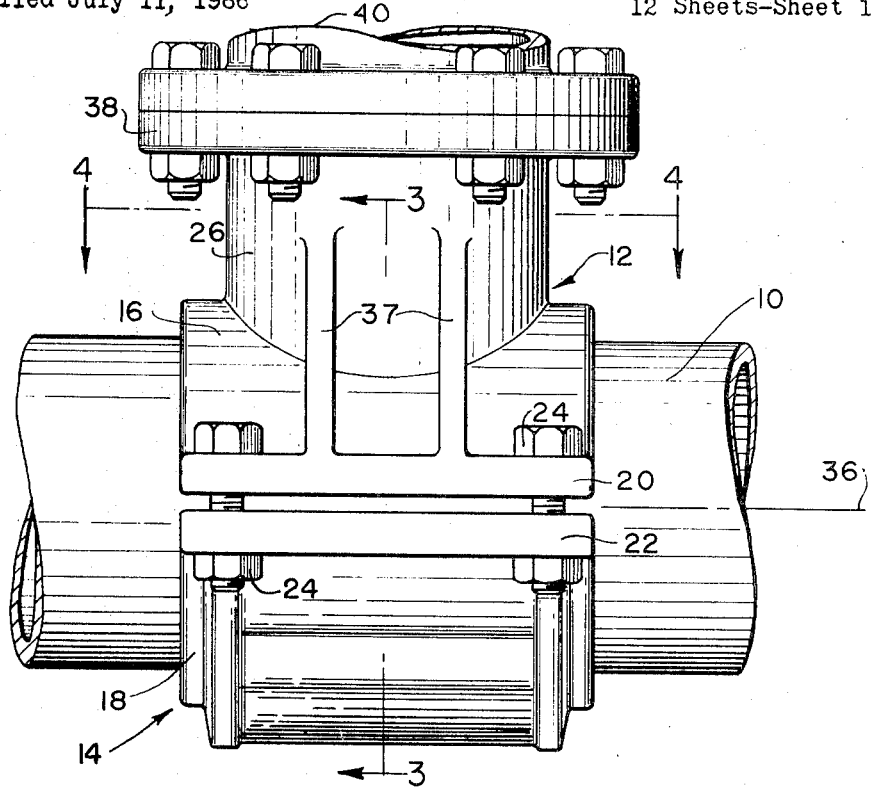
FIG. 1 is a side elevation view of an installed tapping sleeve according to the present invention. This sleeve provides a branch connection having about the same inside diameter as the main pipe.
Figure 2:
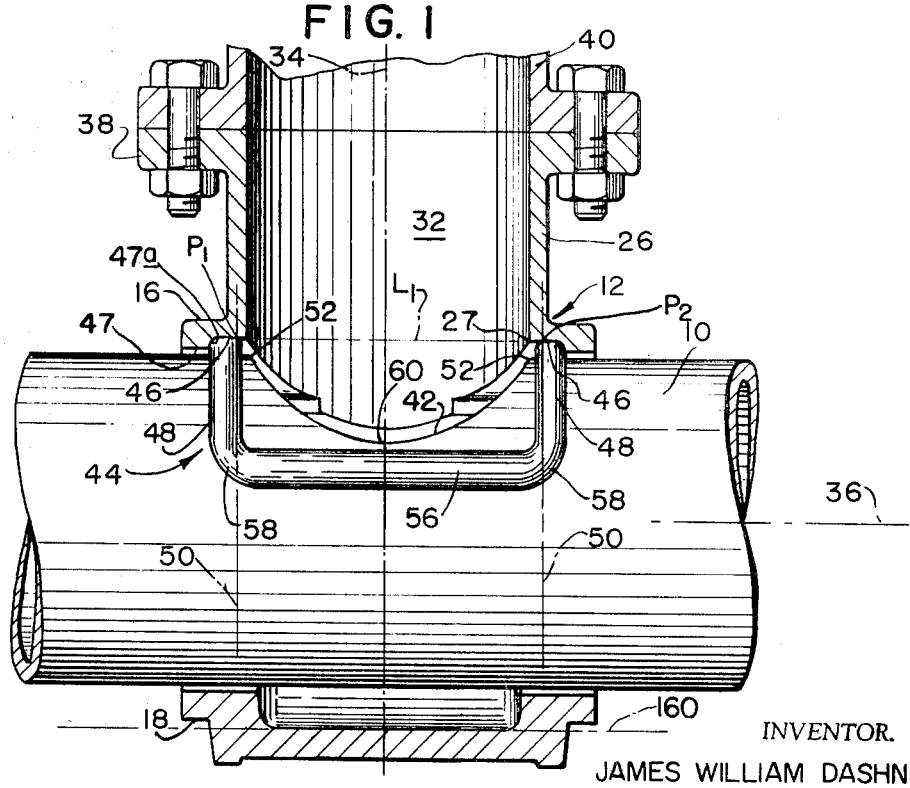
FIG. 2 is a cross-sectioned side elevation view of the tapping sleeve assembly of FIG. 1 showing the configurations of the sealing member, branch opening and branch passage.

Referring now more particularly to the drawing, FIGS. 1 and 2 show a length of pipe 10 on which a branch connection has been made by a tapping sleeve according to the present invention. This sleeve comprises two separate metal casting halves 12 and 14 each with a saddle portion 16, 18 which is curved to embrace about one half of the pipe and which is provided with opposed radially extending flanges 20, 22. Nut and bolt assemblies 24, mounted in these flanges serve to draw the two sleeve halves together against the pipe. In addition the upper sleeve half 12 has an integral hollow cylindrical portion 26 extending radially from an opening 27 in its saddle portion and defining therewith a flow passage 32. The axis 34 of this passage is at substantially right angles to the pipe axis 36. Exterior reinforcing ribs 37 integral with portions 16 and 26 give the upper sleeve half additional rigidity, and a regular integral pipe flange 38 on the upper end of portion 26 provides connection for the valve 40 usually required for these assemblies. In this embodiment the inside diameter of the passage 32 is slightly larger than the inside diameter of pipe 10.

FIG. 2 shows the circular branch opening 42 which has been cut in the pipe 10 and which is substantially the same size as the inside diameter of the pipe. It further shows the shape of the resilient sealing member 44 which is engaged by a surface 46 on the saddle portion 16 and which is compressed somewhat against the external pipe surface by the clamping of the upper and lower sleeve halves around the pipe. Surface 46 is recessed with respect to the surrounding surface 47, and there is a connecting wall 47a which supports the sealing member against outward movement caused by the fluid pressure. In this embodiment the sealing member 44 is endless, cylindrical and solid, and acts like an O-ring to the extent that its being pressed against wall 47a by the fluid pressure increases the sealing action between the upper sleeve half and the pipe.

The line along the sealing member beyond which fluid cannot exert pressure on the upper sleeve half, herein called the sealing boundary, is normally adjacent the inner edge of the sealing member. Preferably the sealing member is made of rubber or rubber-like material having a durometer (Shore A) of about 75–80.

Rather than merely following the edge of the branch opening immediately adjacent thereto or at a small constant distance therefrom, as has been the general practice in the prior art tapping sleeves of this type, the sealing member of FIGS. 1 to 8 has a pair of circumferentially extending legs 48 locating the portions of the sealing boundary in parallel planes 50 which are perpendicular to the pipe axis 36 and as close as practical to the high points 52 on opposite sides of the opening 42.

Figure 6:
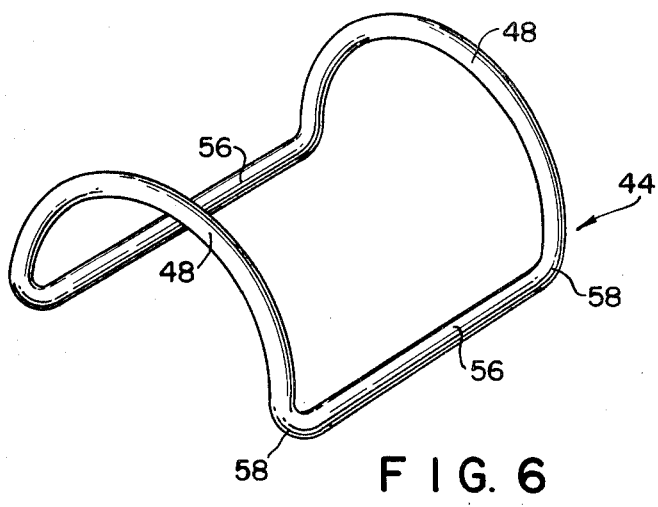
FIG. 6 is a perspective view of the sealing member alone showing the configuration it has when controlled by the upper sleeve half surfaces.

When the sealing member is squeezed by the clamping of the sleeve halves around the pipe its circular cross-section is flattened somewhat and the sealing boundary passes through points $P_1$ and $P_2$ on the surface 46 close to the edge of the opening 27. From such points these circumferential legs continue down the opposite sides of the pipe to level somewhat above a mid-plane 54 (see FIG. 3) which includes the pipe axis 36 and which is perpendicular to the branch axis 34. At this level the legs 48 join additional longitudinally extending legs 56 to form therewith rounded 90° corners 58. Although these longitudinal legs are necessarily above the mid-plane 54, the sealing boundary passes through points $Q_1$ and $Q_2$ well below the branch opening "low points" 60. Preferably the sealing member 44 is molded into a rectangular shape lying in one plane from which it can be relatively easily bent into it final shape during installation. This final shape is best shown in FIG. 6. Preforming these rounded corners permits them to be somewhat sharper than would be possible if the sealing member were merely circular distorted into the corner shapes during installation.

Figure 3:
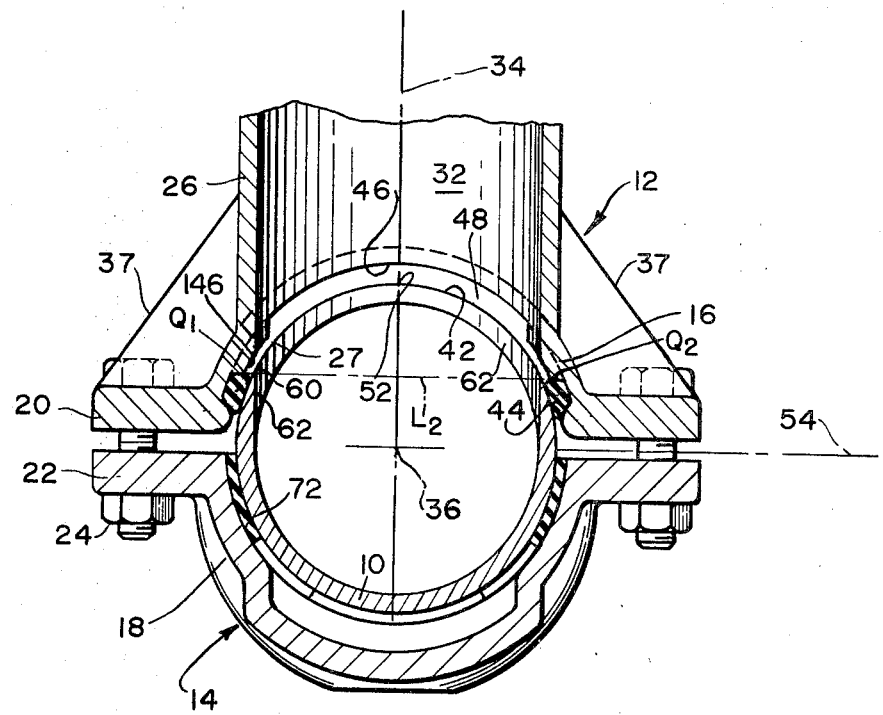
FIG. 3 is a cross-sectioned end elevation view of the assembly of FIGS. 1 and 2, taken on line 3—3 of FIG. 1.
Figure 4:
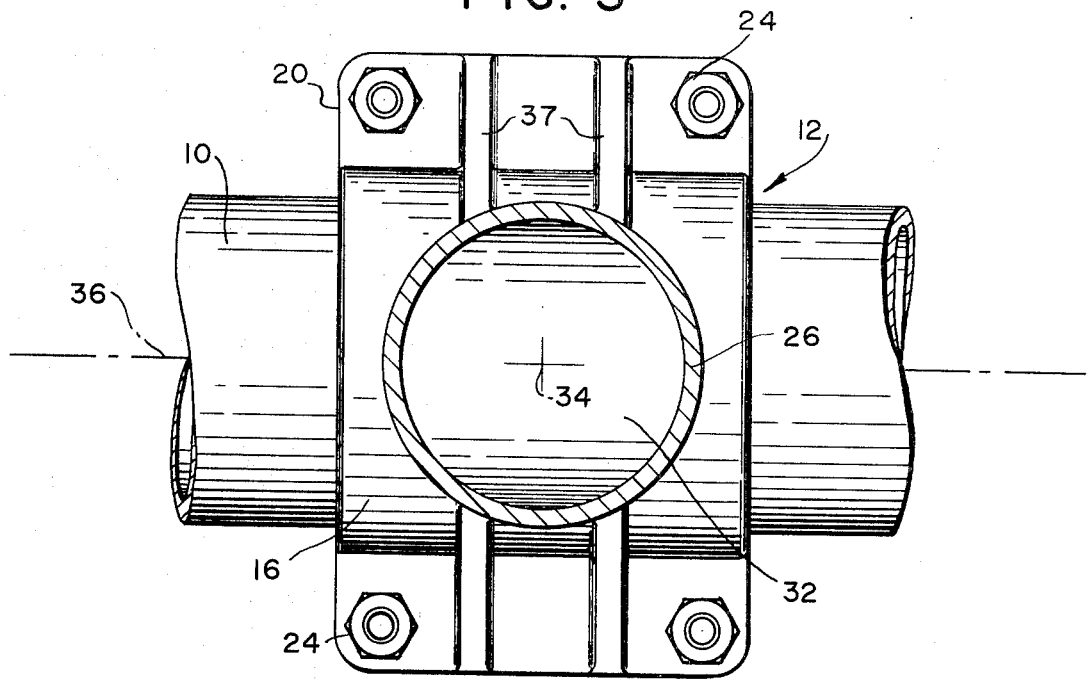
FIG. 4 is a plan view of the assembly taken on line 4—4 of FIG. 1.

FIG. 3 shows that the branch opening edge walls 62 are parallel to axis 34. These walls are formed by a cutting tool (not shown) rotated about this axis and approaching the pipe therealong, and even where the branch pipe is the same size as the pipe 10, the intersection of these walls 62 with the external pipe surface provides substantial areas of the latter between the branch opening low points 60 and the mid-plane 54.

The forces which must be handled by the weakened pipe section (forces caused by the pressure acting only internally) are kept at a minimum when the above-described sealing member arrangement is used. At this same time it is particularly well adapted to continue the lower sleeve half pull against the pipe after the usual bell-joint branch pipe has been connected in the manner illustrated in FIG. 17. The significance of this is understood when it is realized that, as far as is known, no pull on the lower sleeve half has been derived in the prior art from pressure force after such branch pipe is connected. In fact it is believed that in many designs there has been an undesirable pushing of the upper half against the main pipe. Thus, referring first to FIG. 16 the tapping sleeve and valve assembly are shown connected to the main pipe with the valve's bell-joint 64 merely covered by a plate 66. This is a common procedure in municipal gas and water service when it is known that a branch line will be required in the future at a particular location on the main pipe, but such a branch line is not required yet. In the interim the tapping sleeve, valve 40 and plate 66 are supported against line pressure forces by their bolted connections to each other and around the pipe 10. Accordingly, no additional support is needed for this assembly, and the lower half is drawn tightly against the underside of pipe 10 by a force equal to the line pressure times the square area $A_1$. See FIG. 16A. This area $A_1$ is the projection on a plane 54a of the upper sleeve-half area which is encompassed by the sealing boundary. Plane 54a may be any plane perpendicular to the branch axis 34. This area $A_1$ will always be larger than the projected area $A_2$ of the branch opening but in the prior art it has never been much greater. However, in the prior art, the projected area $A_3$ of the valve bell-joint 64 is substantially greater than $A_2$ and therefore greater than $A_1$, as well.

Before the branch pipe is connected the relationship of $A_1$ to $A_3$ is unimportant. The pressure will act on area of the assembly at least as great as $A_2$, and this will produce a very adequate force for drawing the lower half against the pipe. Force produced by pressure acting on plate 66 on any excess of $A_3$ over $A_1$ is cancelled by the force produced by pressure acting on the upper sleeve half on the same area difference but in the opposite direction. However, FIG. 17 illustrates why, after the plate 66 is removed and branch pipe 68 has been connected it has been a disadvantage to have $A_3$ greater than $A_1$.

The pressure acting over the area $A_3$ then produces its force on the branch pipe and urges it away from the main pipe in a direction parallel to the branch axis 34. Because of the construction of the bell-joint 64 the valve 40 cannot exert any supporting force on the branch pipe opposing this pressure force, and accordingly some other fixed structure has to be provided for this purpose. For example, in FIG. 17 the branch pipe is held against movement by the soil 70 in which it is buried, and the result is that the force of the pressure acting over Area $A_3$ is no longer exerted on the lower sleeve half 14.

Figure 17:
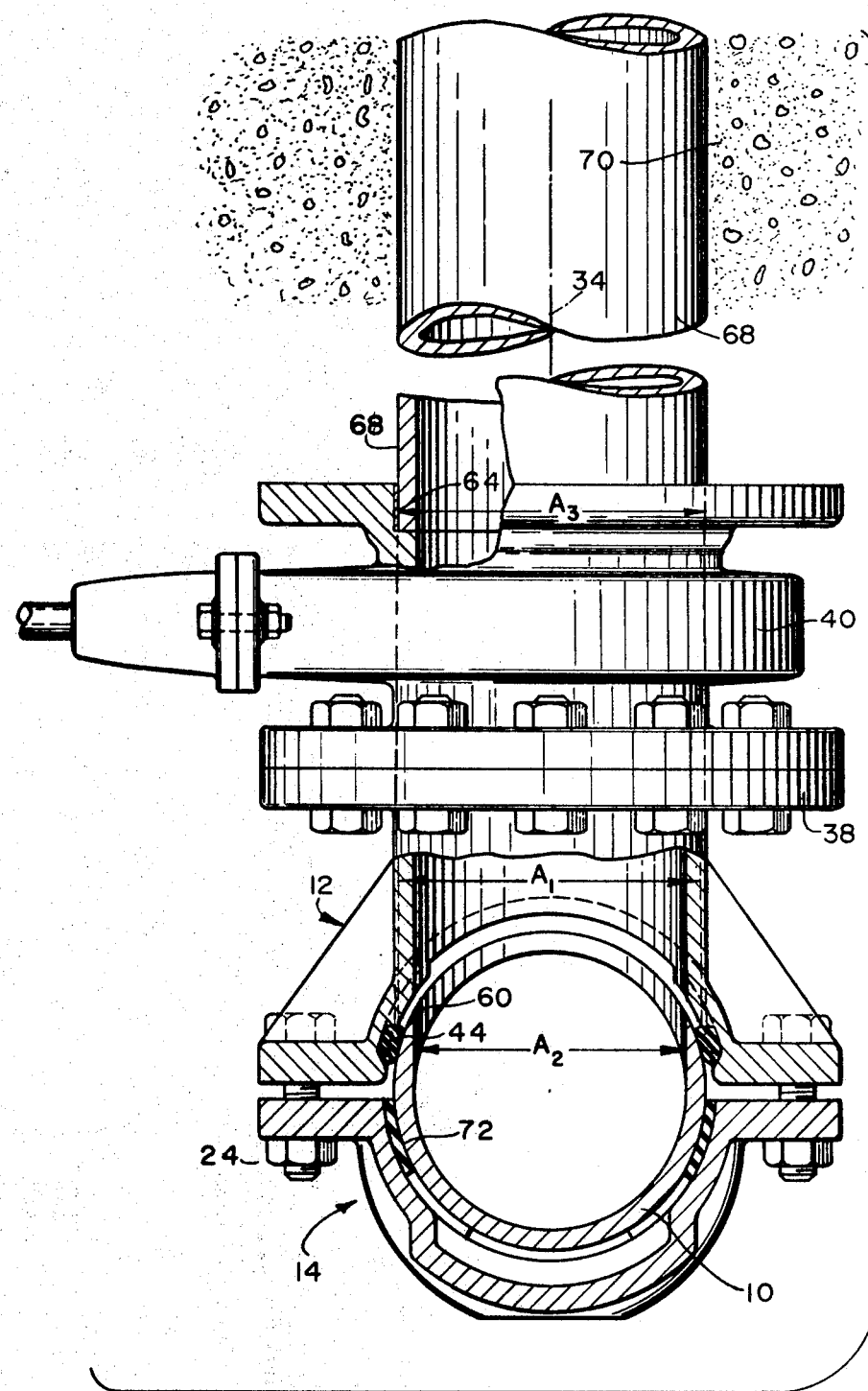
FIG. 17 is a view like FIG. 16, but showing the sleeve and valve assembly after a branch pipe has been connected.

The relative sizes of areas $A_1$ and $A_3$ now become important, FIGS. 16, 16A and 17 show that if the sealing member 44 were to lie as close to the branch opening at all points as it does at the low points 60, the resulting circular area encompassed by such sealing member would actually be smaller than $A_3$, and after the branch pipe were connected pressure force on the upper sleeve half 12 would be toward, rather than away from, the pipe 10. This would actually loosen the clamping of the lower half against the underside of the pipe. Such action of the differential pressure force might seem to be desirable if only because it would assist in the squeezing of the sealing member 44 against the pipe 10, but the opposite is true. This sealing member requires very modest squeezing to achieve a tight seal, and this is easily obtained from the bolt and nut assemblies 24. Any extra squeezing with the kind of force which the pressure could exert by acting on even a slight excess of area $A_3$ over area $A_1$ would be likely to so squash the sealing member that the surface 47 of upper sleeve half would be brought into actual contact with the main pipe at the high point 52. On the other hand the forces required to support the bulging pipe sides by pulling the lower half up against the pipe are of an entirely different order of magnitude, and, as a practical matter, cannot be too large. If, therefore, the area $A_1$ is greater than the area $A_3$ the force which is exerted on the upper sleeve half by the pressure acting on this difference is not resisted by the soil 70 and urges the upper sleeve half away from the pipe 10 along the branch axis. This enables the sides of the lower sleeve half to embrace the pipe as closely as possible and if they fit the pipe well, to prevent the outward bulging of the pipe sides.

Figure 8:
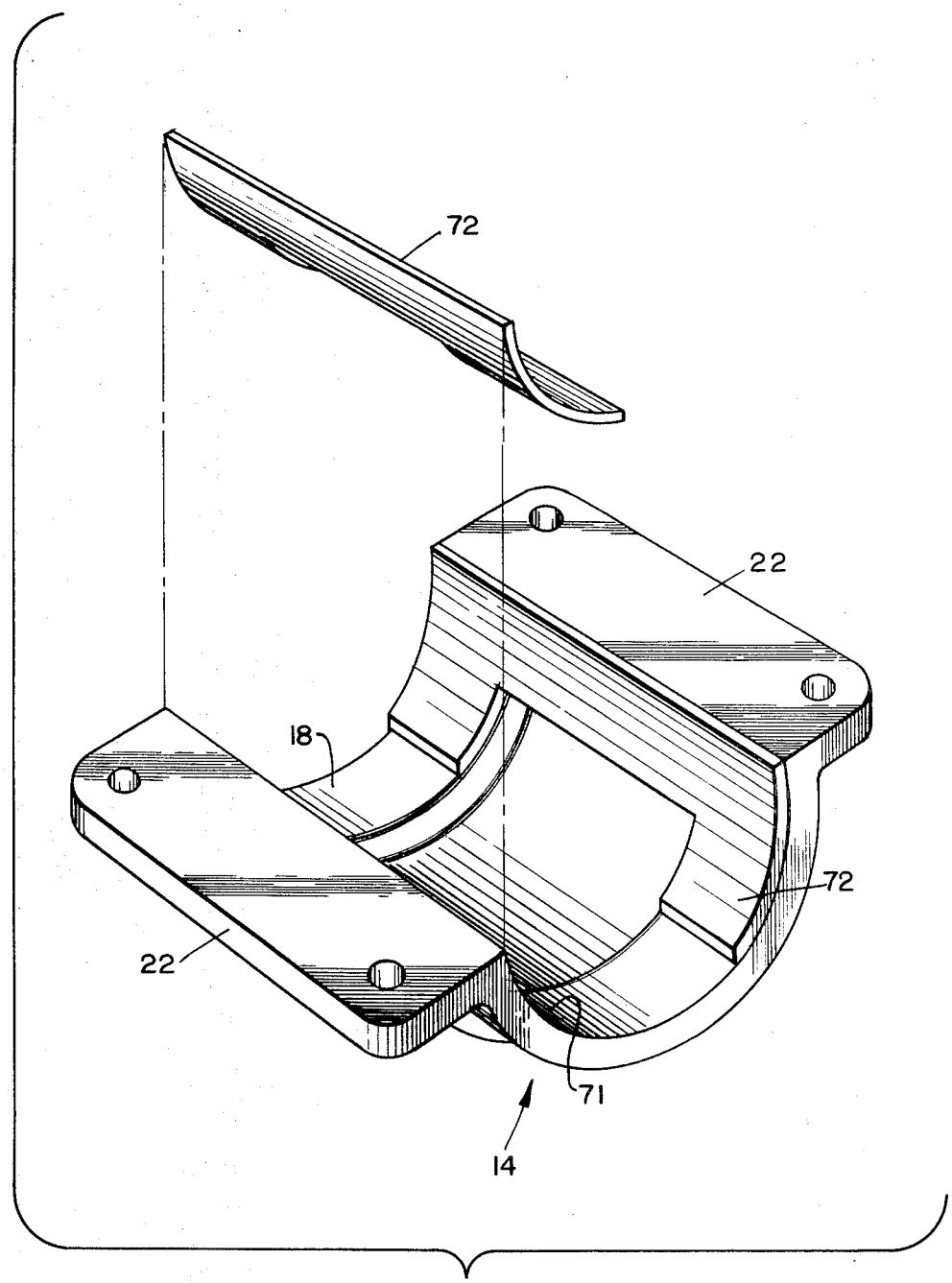
FIG. 8 is a perspective view of the lower sleeve half, showing one resilient pad in its normal position and the other exploded from its normal position.

FIG. 8 shows a feature of the invention which enables the lower sleeve half to restrict the bulging of the pipe even when the pipe is relatively too small. Thus because of the variations which can occur in the outside diameters of the pipes on which the tapping sleeves are installed the lower sleeve half in each size has to be large enough to fit around a pipe of that size having the largest expected diameter. Consequently the lower half fits loosely around all other pipes of that size. However, in accordance with this feature of the present invention resilient pads 72 of rubber or rubber-like material are located on the outer surface portions 71 of the lower sleeve half Each of these pads have a thickness approximately equal to the annular space between the inside diameter of the lower sleeve half and the nominal pipe diameter. In this way the pads are wedged into these spacings and compressed to a greater or lesser degree depending on the variation in outside diameter from the nominal value for the particular piece of pipe encountered. Some such wedging is achieved initially by the nut and bolt assemblies 24 and later by the pressure acting on the excess of area $A_1$ over $A_3$. Preferably the pads do not cover the surface at the center of the lower sleeve half. At this location the pads would interfere with the wedging along the outer surface portions.

Figure 9:
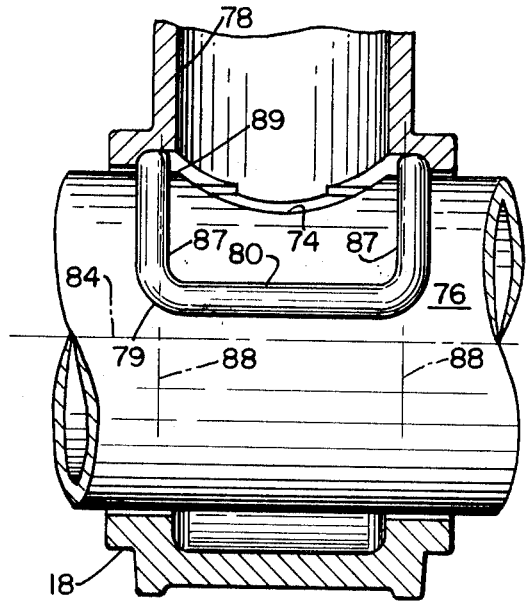
FIG. 9 is a view like FIG. 2, but showing an assembly in which the branch opening has a diameter substantially less than the inside diameter of the pipe.

FIG. 9 shows an embodiment of the invention in which the branch opening 74 is smaller than the inside diameter of the pipe 76. For example, if pipe 76 has an inside diameter of 8 inches, the diameter of the branch opening 74 and of the fitting passage 78 would be 6 inches. Although this smaller branch opening means a lesser weakening of the pipe, it is still desirable to expose as much of the weakened section as possible to external pressure. At the same time, and for the reasons given earlier, it is preferred to expose to external pressure as little as possible of the adjacent continuous portions to the right and left of planes 88. Accordingly, in FIG. 9, as in the first described embodiment, the sealing member 79 has longitudinal legs 80 which, when squeezed, locate the sealing boundary as close as possible to the level of the mid-plane 84 and has circumferential legs 87 (in the parallel planes 88) which, when squeezed, locate the sealing boundary as close as possible to the branch opening high points 89.

Figure 10:
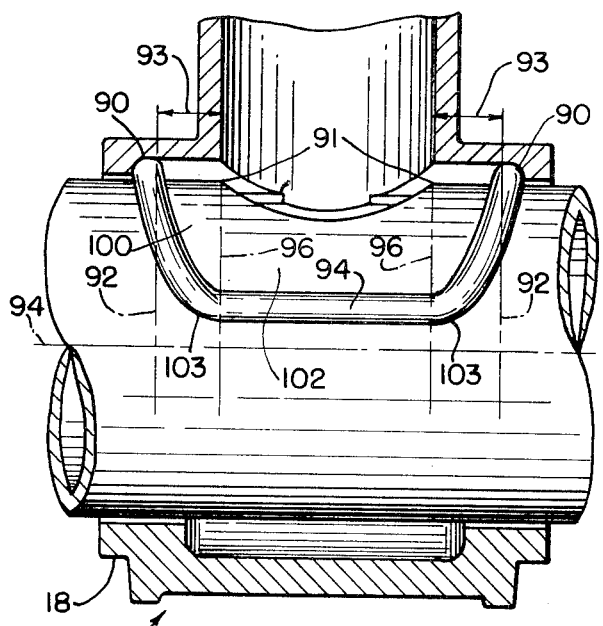
FIG. 10 is a view like FIG. 9 but showing a sealing member having its circumferentially extending legs spaced longitudinally from the branch opening high points and curved therefrom into its longitudinally extending legs.

In the embodiment of FIG. 10 the sealing member portions 90 passing closest to the branch opening high points 91 cause the sealing boundary to reach planes 92 which are spaced short distances 93 from additional parallel planes 96 containing these high points. In addition this sealing member curves smoothly from portions 90 into the straight longitudinal legs 94 which cross the weakened section between the planes 96. The disadvantage of the FIG. 10 embodiment is that the pressure forces acting on the circumferentially continuous pipe sections between planes 92 and 96 are exerted non-uniformly. Because they are continuous these sections have more than enough strength for handling either uniform or non-uniform pressure forces, but the distortion which even they experience when the forces are non-uniformly exerted does add to the bulging of the weakened section which is between them and does impose some further stress on this section. If the spacing 93 is great enough this stress increase appears to more than offset the advantage of balancing the pressure on an increased area surrounding the branch opening and the seal boundary. It is part of the discovery of the present invention that the advantage of applying external pressure to the upper areas 100 of the continuous sections is not comparable to the advantage of applying such pressure to the corresponding areas 102 of the weakened section. By far the most desirable embodiments apply external pressure to a maximum area of the weakened section and to a minimum area of the continuous sections on either side thereof.

However, an arrangement like that of FIG. 10 may actually assist in encompassing a maximum area of the weakened section. For example, the spacings 93 enable the use of larger radius corners at 103. As a general rule it has been found that the larger the corner radii the less critical the smoothness and curvature of the supporting walls. Because the adverse effect of some pressure bulging of the continuous sections is tolerable, it is within the scope of this invention to thus impose non-uniform pressure forces on these continuous pipe sections.

Figure 11:
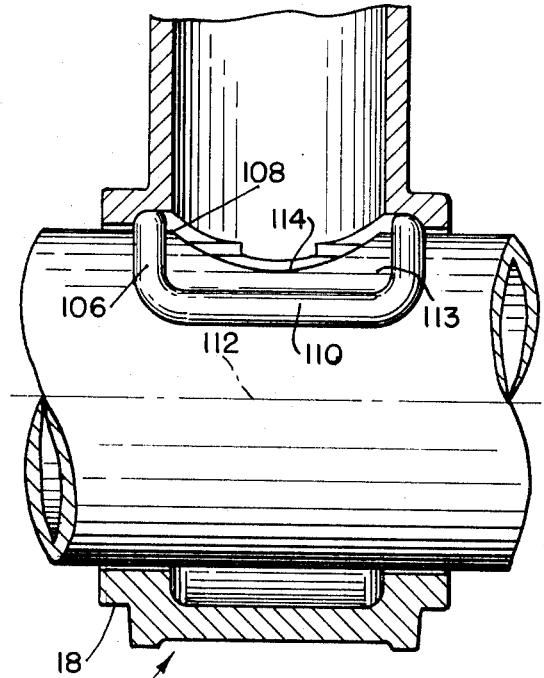
FIG. 11 is another view like FIG. 9 but showing the longitudinally extending sealing member legs spaced a lesser distance below the branch opening low points.

FIG. 11 shows another rectangular sealing member in which the circumferential legs 106 again cause the sealing boundary to pass quite close to the opening high points 108, but in which the longitudinal legs 110 do not locate the sealing boundary as close to the mid-plane 112 as in previous embodiments. The benefits of the invention are still realized here because the corner areas 113 are exposed to external pressure. Even where the longitudinal legs 110 cause the sealing boundary to pass quite close by the low points 114 the increase in the pressures which can be handled by the FIG. 11 assembly is appreciable, because of these corner areas 113.

Figure 12:
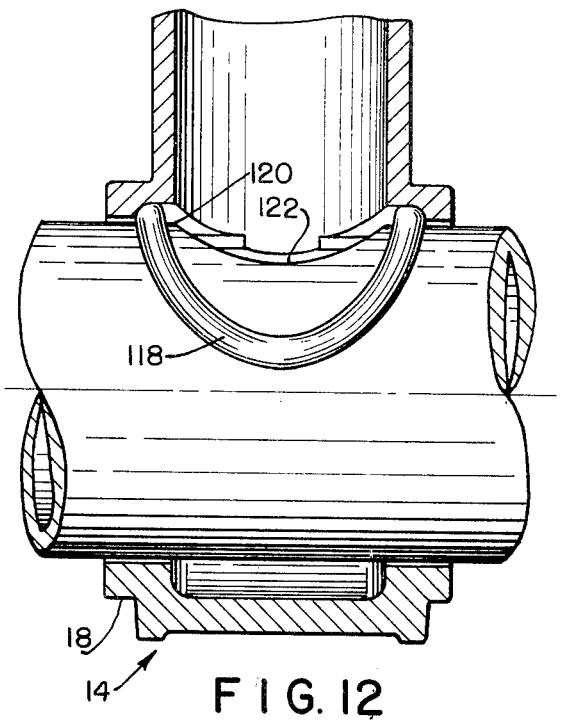
FIG. 12 is still another view like FIG. 9, but showing a non-rectangular sealing member having both its circumferentially and longitudinally extending legs curved and having the former passing right next to the branch opening high points.

FIG. 12 shows another embodiment in which the sealing member 118 curves smoothly throughout but is like the other embodiments because it causes the sealing boundary to diverge from the edge of the branch opening as it extends from its location nearest each of the branch opening high points. In addition FIG. 12 is like the other embodiments because it causes the sealing boundary between the high and low points to be spaced from this edge a greater distance than at the high points. This construction results in a greater exposure of the weakened section to external pressure than would be possible if the sealing member remained concentric with the branch opening.

Figure 13:
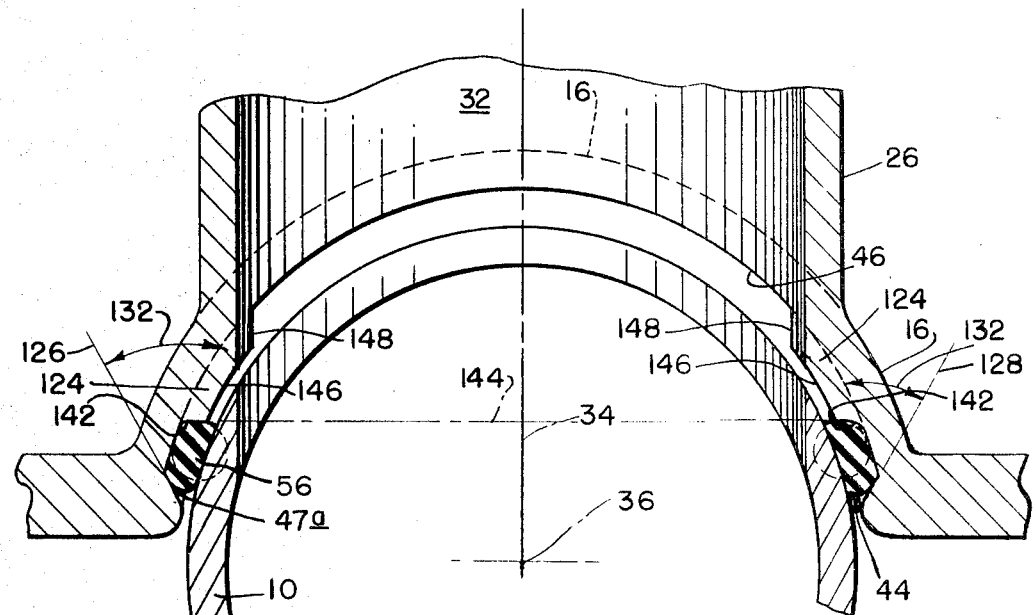
FIG. 13 is a view like FIG. 3, but enlarged to show the positions of the parts when the outside pipe diameter is relatively large.
Figure 14:
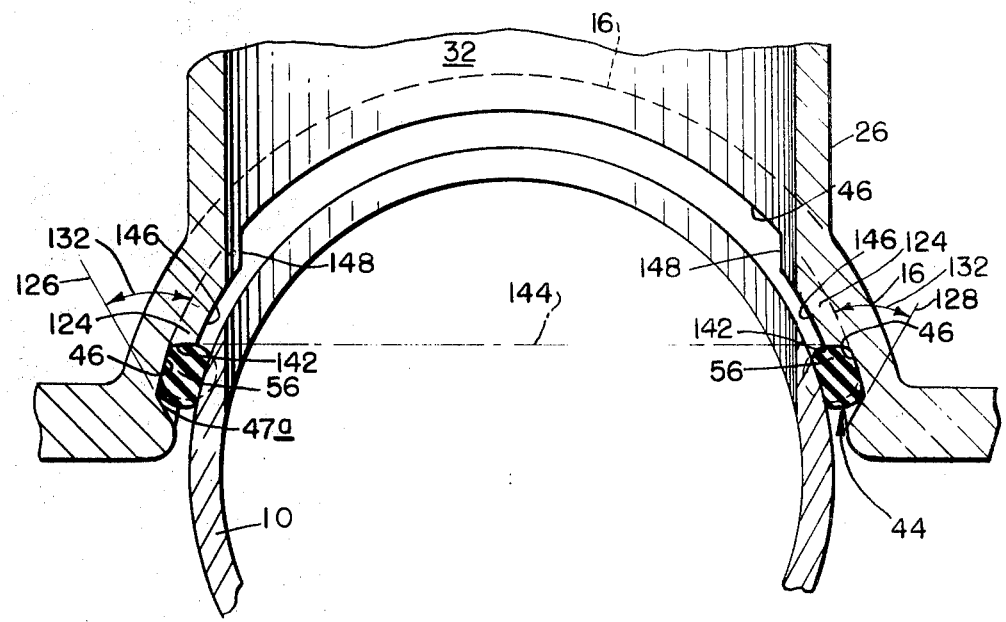
FIG. 14 is a view like FIG. 13 but showing the positions of the parts when the outside pipe diameter is relatively small.

In FIG. 2 the sealing member 44 is pressed against wall 47a by the fluid pressure. The relationship of the longitudinally extending portions of this wall to the cylindrical surface 46 and to the special ridges 124 are shown in FIGS. 13 and 14. These portions lie in separate planes 126 and 128 which are parallel to the axis 36 and form substantial angles 132 with the surface 46.

The relationship of the circumferentially extending wall portions to the surfaces 46 and 47 are shown in FIG. 15. These portions lie in flat planes 136 and 138 which are perpendicular to the axis 36 and shown in FIG. 5.

The corner transitions of the wall 47a from the circumferentially extending portions to the longitudinally extending portions are gradual and smooth.

The circumferentially extending sealing member portions 48 are squeezed against the pipe by the upper sleeve surface 46, but the longitudinally extending sealing member portions cannot be thus squeezed by this surface. Accordingly the ridges 124 are provided along the longitudinally extending wall portions between them and the branch passage. These ridges rise from the cylindrical surface 46 and have surfaces 142 which lie substantially in a single plane 144 parallel to the axis 36 and which provide the squeeze and support on the longitudinal legs of the sealing member 44 when the two sleeve halves are clamped around the pipe. Each surface 142 joins the cylindrical surface 46 at a substantial angle.

The remaining ridge surfaces 146 and 148 do not engage the sealing member 44. Surface 146, representing the top of the ridge, is preferrably parallel to cylindrical surface 46 and spaced therefrom. Surface 148 can form a wide range of angles with surface 46 since it is not a functional surface.

Figures 5, 7:
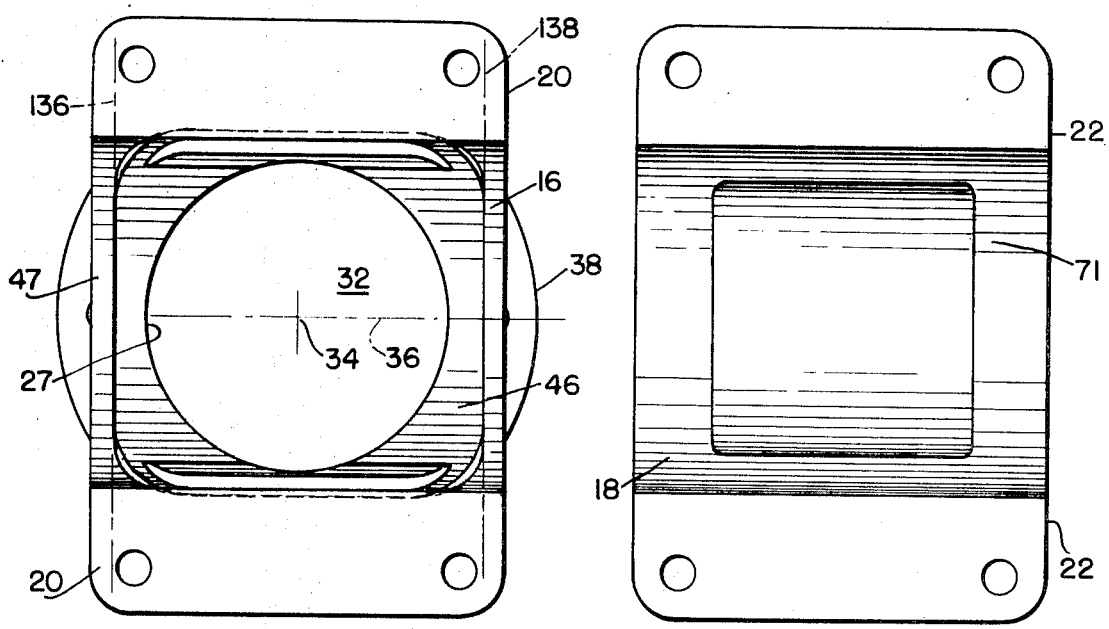
FIG. 5 is a bottom plan view of the upper tapping sleeve half, showing the branch passage therethrough and the surfaces for controlling the sealing member.
FIG. 7 is a top plan view of the lower tapping sleeve half.

The ends of all these ridge surfaces 124 taper into surface 46 at the corners. Surface 142 first comes to bear on the sealing member 44 as the longitudinal legs thereof emerge from the corner curve. In this way the squeeze on the sealing member is continuous from the circumferential legs through the gently curving corners to the longitudinal legs. At the same time the walls 47a are present in all locations, including the corners, to support the sealing member 44 against outward movement by the fluid pressure. Preferably the walls 47a are twisted, as they enter the corners from their circumferentially extending portions, so that they are presented somewhat toward the main pipe. On a plane perpendicular to the branch axis 34 there is a significant projection of the surfaces of these walls 47a in the corners. As it leaves the circumferentially extending portion this twisting surface 47a takes over some of the squeezing of the sealing member since the surface 46 is becoming less able to do it, and the ridge surface portions 142 have not yet come into action. Farther along the corner these latter portions begin to engage and squeeze the sealing member. The surface 47a is then leaving the corner and entering its longitudinally extending portions, and in this region the surface 47a reverses its twist, as shown in FIG. 5, to provide the barrier which prevents the pressure from driving the sealing member out between the upper fitting half and the main pipe.

FIG. 13 shows the relative positions of the parts when a main pipe 10 of unusually large outside diameter is encountered, and FIG. 14 shows the corresponding positions when a main pipe 10 of unusually small outside diameter is encountered. Because of the special configuration of the walls 47a and the ridge surfaces 142 sufficient squeeze is applied to the sealing member, and sufficient room is provided for the distorted sealing member material, in both these extreme cases.

Figure 18:
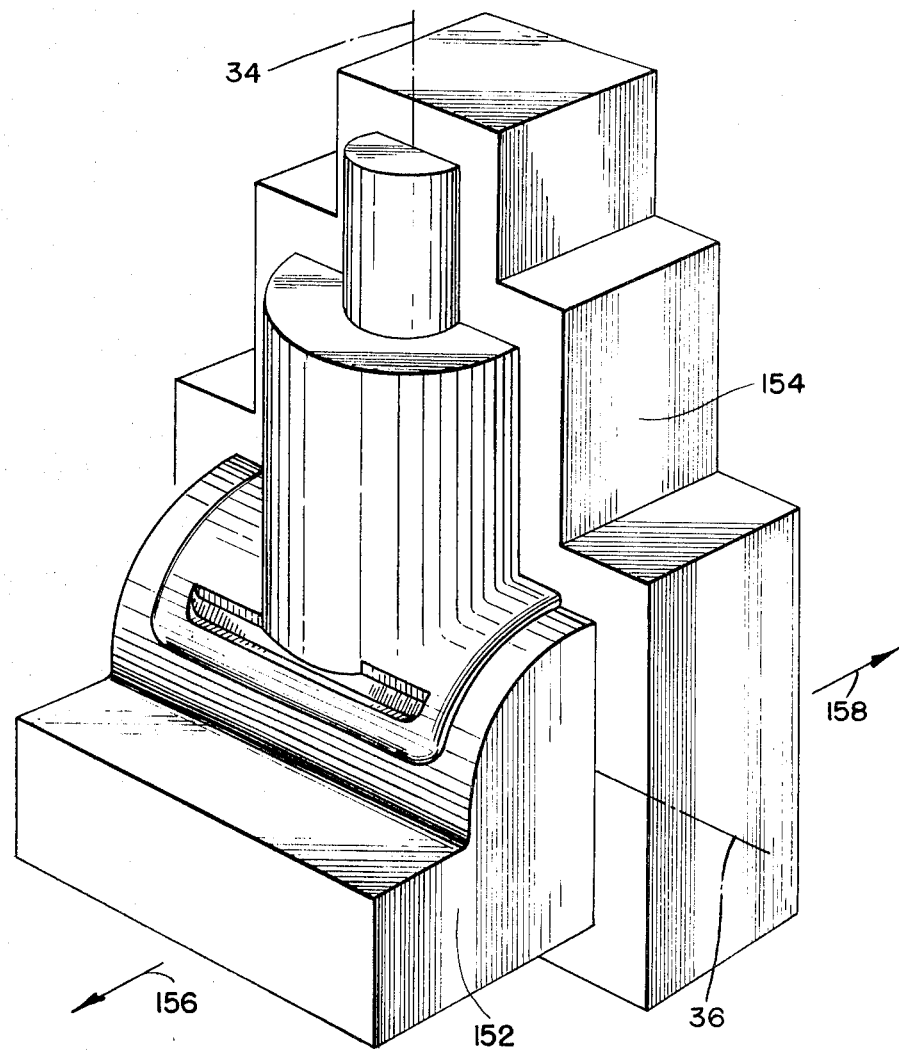
FIG. 18 is a perspective view showing half of a core box and the core therein which can be used for casting the special sealing member controlling surfaces on the upper sleeve half.

The wall 47a and ridges 124 are shaped so that they can be formed as part of the upper sleeve half casting and so that they require no machining after being cast. This is a very real benefit because of the expense which would be involved in machining such complex surface shapes. More particularly, the surface 46, 47a, 142, 146 and 148 can be provided by a special one-piece core 152 which is shown in FIG. 18 and which is formed by a core box 154. There are no undercuts which would prevent drawing the core box halves in the directions of arrows 156 and 158, respectively.

The terms upper sleeve half and lower sleeve half have been used herein to designate members 12 and 14, respectively. Other terms can also be used. For example member 12 may be called a tapping sleeve branch member, and member 14 may be called a tapping sleeve back-up member.

In many embodiments of this invention the shape of the area encompassed by the sealing member is important. This shape is determined by the sealing boundary beyond which the fluid pressure cannot act on the external pipe surface or on the branch member surface. In most cases the sealing boundary will follow the inner edge of the sealing member. It may be spaced outward somewhat from this edge toward the center of the sealing member. In any case the sealing boundary will follow the general direction of the elongated sealing member.

The novel shape of the sealed area can be defined with respect to the passage opening in the upper sleeve half. Invariably these openings will be circular when viewed along the axis of the branch passage, and in the prior art the sealing boundary has been spaced substantially uniformly from the edge of this opening. It is a major feature of this invention that the sealing boundary diverge from the opening edge as it extends from the opening high points along the curved surfaces between which it is squeezed.

The novel construction can be described with reference to certain points along the sealing boundary. For example, in FIG. 2 this boundary passes through one such pair of points $P_1$ and $P_2$ in the surface 46 surrounding the opening 27. These points are on diametrically opposite sides of the opening and form a straight line $L_1$ parallel to the axis 36.

Another pair of sealing boundary points $Q_1$ and $Q_2$ (in FIG. 3) are shown on surfaces 142 diametrically opposite each other and forming a line $L_2$ perpendicular to the axis 36. The novel shape of the sealing boundary can be defined in terms of the relative distances of these points (and other points between them) from the nearest edge of the opening. The points $Q_1$ and $Q_2$ are adjacent the intersections of the ridge surface 142 and 146. When the tapping sleeve is in service the fluid pressure may cause the points $Q_1$ and $Q_2$ to be located elsewhere on the surface 142 or on the portion of surface 46 adjacent 142 or even on surface 47a. It is a feature of the invention that the sealing member can act in the nature of an O-ring and form the sealing boundary on such a portion of surface 46 or on surface 47a when appreciable pressure is employed. The fluid pressure tends to push the longitudinal sealing member legs 56 outward toward the surface 47a, and if this pressure is great enough and these legs are free enough to be shifted in this outward direction, the sealing boundary will shift accordingly. The result will be location of the sealing boundary as close as possible to the plane 54 and therefore exposure of the greatest possible area of the upper sleeve half to external pressure.

Thee shape of the sealing boundary relative to the opening can be further defined by considering the projection of this shape on a plane 54a which is perpendicular to the branch member axis. Within this projected shape is the effective branch member area $A_1$ on which the fluid pressure acts.

The lower sleeve half or backup member has an inner surface which is presented toward the pipe and comprises outer portions on either side of a central portion. No particular change in this surface is required to mark the transition from the central portion to the outer portions. The edge of the cushion member will comprise this transition. However, to increase the bending resistance of this member it is preferred that the central surface portion be recessed substantially with respect to the outer portions, and it is convenient to have this cushion member edge extend to the recess.

The pipe is purposely not engaged at the central inner surface portion. This concentrates the back-up force up along the sides of the main pipe, and because of the slope in the outer surface portions a wedging action prevents bulging of the pipe sides.

The extensive recessing of the central inner surface portion increases the rigidity of the back-up member. By having this recessing at least as great as the thickness of the back-up member, measured at the outer surface portions, and by having this recessing extend to the edges of the cushion members as much metal as possible is moved beyond the neutral bending axis 160 (in FIG. 2) and the rigidity is excellent.

In all of the tapping sleeve sizes, including the reducing sizes in which the branch opening is smaller than the inside diameter of the main pipe, it is necessary for the longitudinally extending portions of the wall 47a to lie in planes which form substantial angles with the cylindrical surface 46. In FIGS. 13 and 14 these planes are substantially those indicated by the numerals 126 and 128, and the substantial angles referred to are indicated by the numerals 132. Such angles prevent the pressure of the fluid from driving the longitudinal sealing member legs 56 out of the upper sleeve half between this half and the surface of the main pipe. In the size-for-size embodiments of FIGS. 1-10 and 13-18, in which the branch opening is substantially the same size as the inside diameter of the main pipe, the portions of the cylindrical surface 46 which are adjacent the longitudinally extending portions of wall 47a are usually so nearly parallel to the brnach axis 34 that the provision of the substantial angles 132 automatically requires that these portions of wall 47a be undercut when viewed in FIG. 5. The reverse twist of the walls 47a referred to earlier provides a smooth blending of the wall 47a from each corner portion thereof into these undercut longitudinally extending portions.

Figure 19:
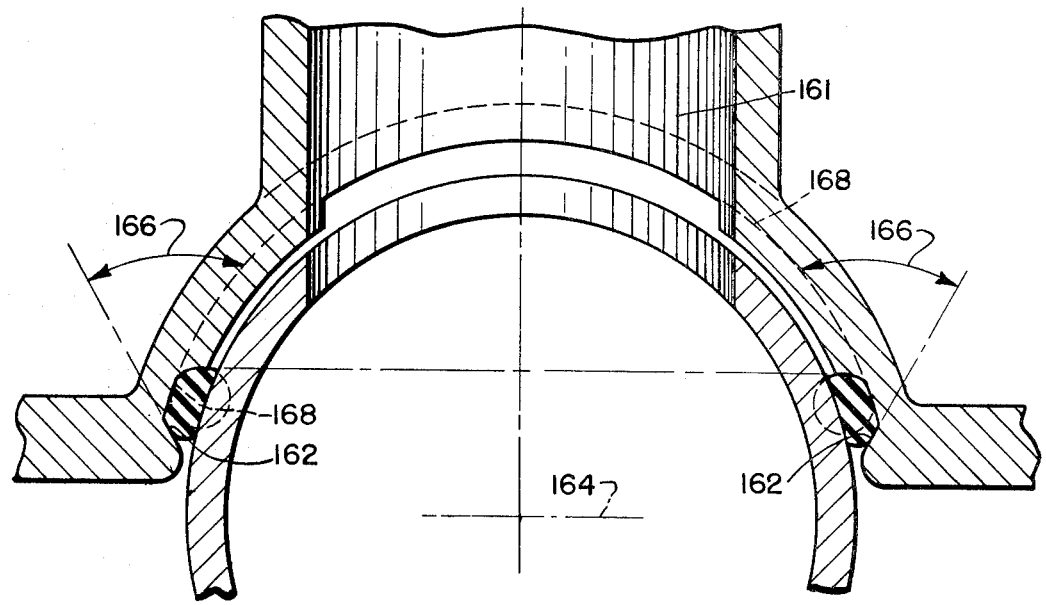
FIG. 19 is a view like FIG. 13 but showing a tapping sleeve in accordance with the invention in which the branch passage is smaller than the inside diameter of the main pipe.
Figure 20:
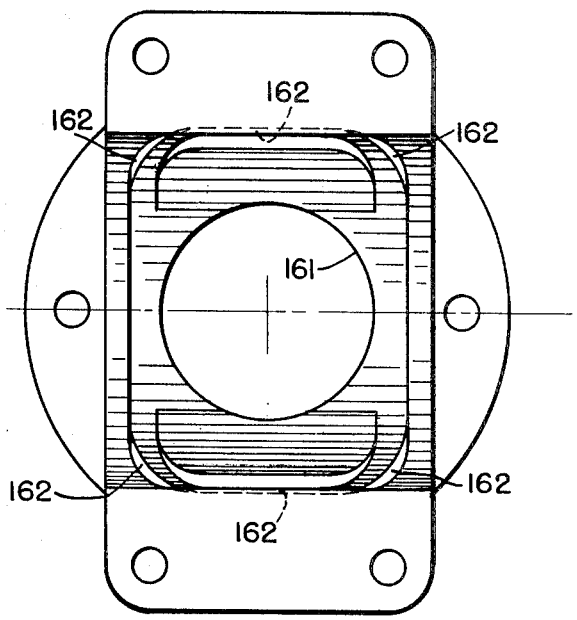
FIG. 20 is a view like FIG. 5 but of the embodiment of FIG. 19.

Even where the branch opening in the main pipe is smaller than the inside diameter of the main pipe it is still preferred to have the longitudinally extending portions of the wall 47a in the same location as in the size-for-size tapping sleeve. This is illustrated in FIG. 19 which is a view like FIGS. 13 and 14 and shows that except for the branch passage 161 being much smaller in diameter than the corresponding passage 32 in FIGS. 13 and 14 the construction is the same. The longitudinally extending portions of the wall 162 in FIG. 19 have the same locations with respect to the mid-plane 164 as the corresponding portions of wall 47a in FIGS. 13 and 14, and in forming substantial angles 166 with the surface 168 these longitudinally extending portions of wall 162 are also undercut, as shown in FIG. 20. In each of the corners the wall 162 twists toward plane 164 and then reverses its twists as it progresses from the circumferential portion to the undercut longitudinal portion.

Figure 21:
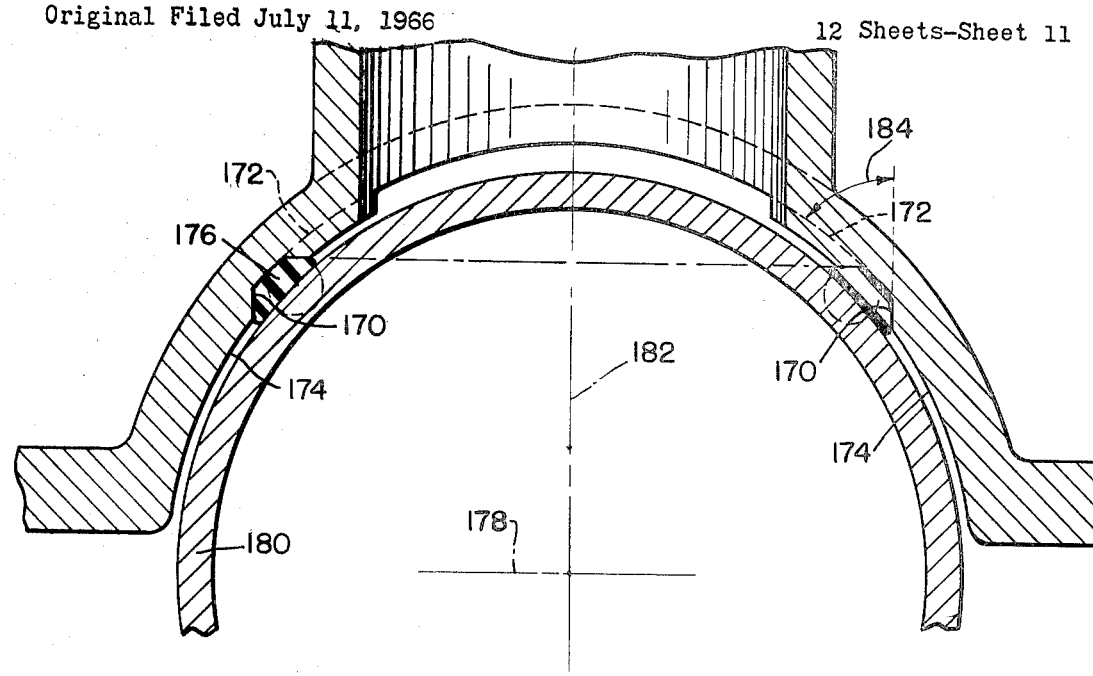
FIG. 21 is a view like FIG. 19 but showing the use of a modified sealing member.
Figure 22:
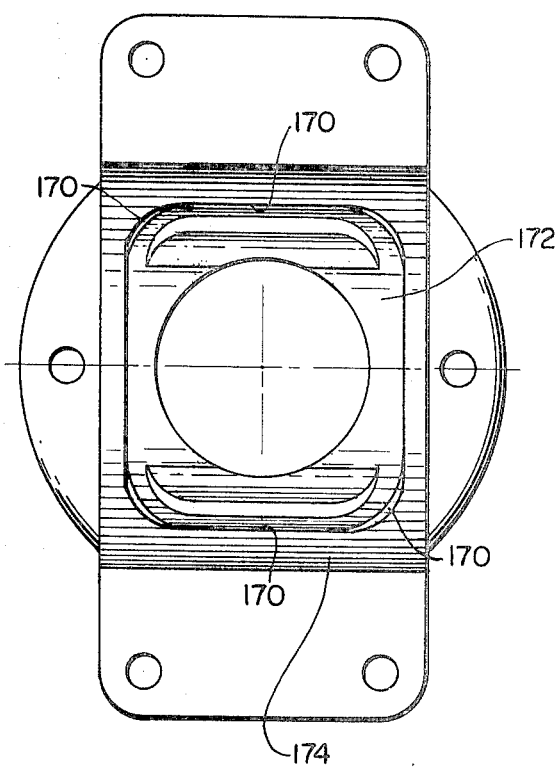
FIG. 22 is a view of and like FIG. 20 but of the embodiment of FIG. 21.

However, there maybe valid reasons for not employing this preferred form of the invention is the reducing tapping sleeves. Since the smaller branch openings in such reducing tapping sleeves mean lesser weakening of the main pipe than in the case of the size-for-size sleeves, it is permissable to locate the longitudinally extending portions of the wall, corresponding to 47a (FIGS. 13 and 14) and 162 (FIGS. 19 and 20), somewhat farther away from the mid-plane of the main pipe. One such embodiment is shown in FIGS. 21 and 22 in which 170 indicates the wall joining the cylindrical surfaces 172 and 174 and retaining the sealing member 176. The longitudinally extending portions of this wall are so far from the mid-plane 178 of the main pipe 180 that they can be parallel to the branch passage axis 182 and still form the required substantial angle 184 with surface 172. Hence, as viewed in FIG. 22 there is no undercutting of these portions of wall 170. In each corner, however, this wall 170 again twists toward the mid-plane 178 and then reverses its twist as it progresses from its circumferentially extending portion to its longitudinally extending portion.

One reason for employing proportions like those of FIGS. 21 and 22 is that considerable savings can be realized in the manufacture of a line of tapping sleeve sizes by having one size-for-size sleeve and a number of reducing size sleeves using a common sealing member. For example, a sealing member designed for an 6 x 6 tapping sleeve (six inch inside diameters for both main and branch pipes) in accordance with the preferred form of the present invention can also be used on the following reducing tapping sleeves: 8 x 6, 10 x 6 and 12 x 6. FIGS. 21 and 22 illustrate the general proportions of the 10 x 6.

Figure 23:
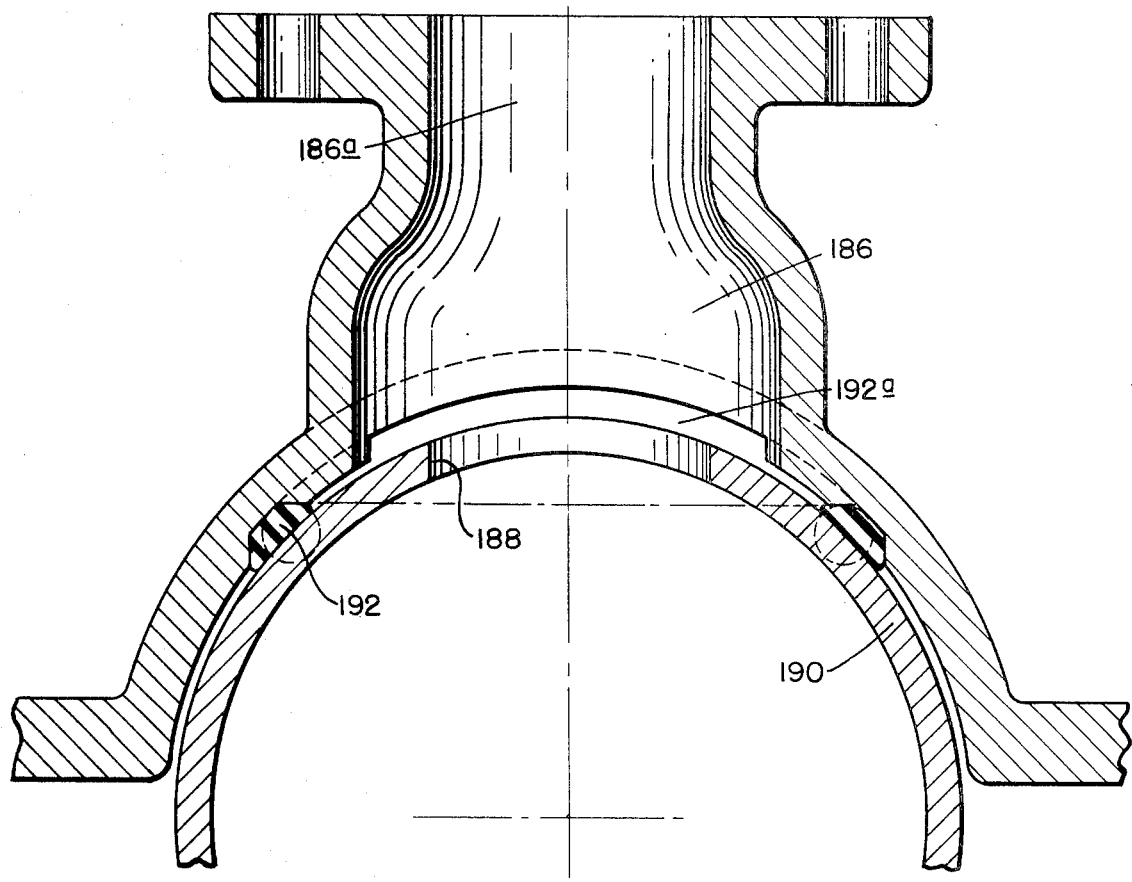
FIG. 23 is a view like FIG. 21 but showing the branch passage in the upper sleeve half reduced toward its outer end.
Figure 24:
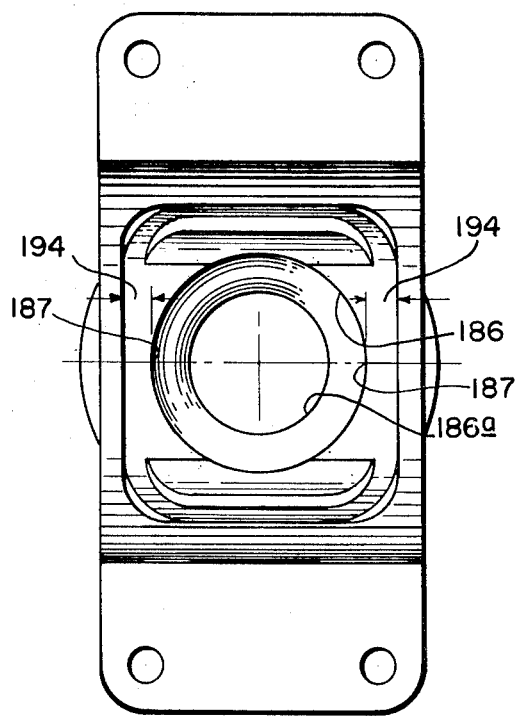
FIG. 24 is a view like FIG. 22 but of the embodiment of FIG. 23.

Further savings can be realized in producing a complete line of tapping sleeve sizes by merely necking down the upper sleeve half passages of certain reducing sizes to achieve the larger reductions. For example a 10 x 4 sleeve in accordance with the present invention can be achieved as shown in FIGS. 23 and 24. The upper sleeve half in this embodiment is identical to that of FIGS. 21 and 22, but the branch passage 186 is reduced at 186a to receive a four inch branch pipe. The hole 188 cut in the main pipe 190 is a four inch hole. FIG. 23 shows that since this arrangement uses a sealing member 192 originally intended for a 6 x 6, the spacing 194 between the circumferential legs 192a of the sealing member and the "high points" 187 of the branch passage opening are no greater than in FIG. 21.

I claim:

1. In a tapping sleeve for a pipe, a branch member comprising a pipe-embracing portion having a surface which is curved about an axis substantially parallel to said embraced pipe, which is adapted to fit around a part of the periphery of said pipe, which has an opening therein and which terminates at opposite, circumferentially spaced edges and opposite axially spaced ends, and a branch portion extending from said pipe-embracing portion at said opening and at a substantial angle to said pipe-embracing portion and having a passage therein communicating with said opening, and a sealing member located within said branch member and forming with said surface a sealing boundary which surrounds said opening, the improvement comprising said sealing boundary diverging from the edge of said opening as it extends from a first pair of points located on said surface closely adjacent to said opening and at either end of a diameter of said opening which is parallel to said axis, and said sealing member being contained within said opposite, circumferentially spaced edges, whereby a non-concentric sealing boundary is formed around said opening encompassing a relatively large area of said pipe-embracing surface thereby to reduce unbalanced radial, fluid forces on the embraced portion of said pipe when said tapping sleeve is attached thereto and a tapped opening is made in said pipe.

2. A tapping sleeve according to claim 1, said boundary being circumferentially spaced from said opening a greater distance than the axial spacing thereof from said opening.

3. A tapping sleeve according to claim 1, said sealing boundary extending through a second pair of points located on said surface at opposite ends of the circumferential diameter of said opening, the spacing from said opening of said boundary between said first and second points being greater than the spacing from said opening of said first points and of said second points.

4. A tapping sleeve according to claim 3, wherein the projection of said boundary on a flat plane parallel to said axis and perpendicular to the center axis of said opening has a generally rectangular shape.

5. A tapping sleeve according to claim 4, wherein said rectangular shape has a pair of opposite sides which are substantially parallel to a line which is perpendicular to said axis.

6. A tapping sleeve according to claim 5, wherein the remaining opposite sides of said rectangular shape are substantially parallel to said axis.

7. A tapping sleeve according to claim 1, wherein said curved surface has the shape of a portion of a cylinder, wherein said axis is the longitudinal axis of said cylinder, wherein said sealing member engages said cylindrical surface and forms therewith circumferentially extending sealing boundary portions, which are on opposite sides of said opening and which lie in planes substantially perpendicular to said axis, and axially extending sealing boundary portions which are on opposite sides of said opening.

8. A tapping sleeve according to claim 1, wherein said surface has the shape of a portion of a cylinder, surrounds said opening and is a recessed surface in another curved surface which also surrounds said opening, said opening lying in said recessed surface, said recessed surface and said other surface being joined by side walls also surrounding said opening, said sealing member being located along the outer margin of said recessed surface with its outer edge adjacent said side walls.

9. A tapping sleeve according to claim 8, wherein said side walls and said sealing member each have circumferentially extending portions which are on opposite sides of said opening and axially extending portions which are on opposite sides of said opening.

10. A tapping sleeve according to claim 9, including a pair of elongated axially extending ridges extending from said recessed surface and located on opposite sides of said opening between said axially extending side walls and said opening, said ridges being spaced from said opening and said axially extendnig side walls.

11. A tapping sleeve according to claim 10, wherein said axially extending portions of said sealing member are located between said ridges and said axially extending side walls and engage said ridges to form two sealing boundary portions parallel to said axis and wherein said other surface has the shape of a cylinder coaxial with said cylindrical recessed surface.

12. A tapping sleeve according to claim 1, in combination with said pipe, the outer surface of which is concentric with and is embraced by said surface of said branch member and which has a side opening underlying and in communication with said opening in said branch member surface and the passage in said branch portion, said sealing member surrounding said side opening and being compressed between said branch member surface and said outer pipe surface to form with said pipe surface a sealing boundary which diverges from the edge of said side opening as it extends from a pair of points located on said pipe surface at either end of the diameter of said side opening which is parallel to the pipe axis.

13. In a tapping sleeve for a pipe, a branch member comprising a pipe-embracing portion having a surface which is curved about an axis substantially parallel to said embraced pipe, which is adapted to fit around a part of the periphery of said pipe and which has an opening therein, and a branch portion extending from said pipe-embracing portion and having a branch passage located at a substantial angle to said axis and communicating with said opening, and a sealing member within said branch member forming with said surface a sealing boundary which surrounds said opening, the improvement comprising said sealing boundary diverging from the edge of said opening as it extends from a first pair of points located on said surface closely adjacent to said opening and at either end of a diameter of said opening which is parallel to said axis, and said surface being a recessed surface in another curved surface and being substantially parallel to the embraced pipe, said opening lying in said recessed surface and being surrounded thereby and by said other surface, said recessed surface being joined to said other surface by side walls also surrounding said opening and diverging from the edge of said opening as they extend from a pair of points located at either end of said diameter of said opening, said sealing member being located in said recess along and within the outer margin of said recessed surface with its outer edge adjacent said side walls, whereby said recess surface unrestrainedly positions said sealing ring and permits accommodation thereof to variations in the curvature of the periphery of said pipe in relation to the curvature of said recess to provide a fluid seal therebetween.

14. In a tapping sleeve for a pipe, a branch member comprising a pipe-embracing portion having a surface which is curved about an axis substantially parallel to said embraced pipe, which is adapted to fit around a part of the periphery of said pipe and which has an opening therein, and a branch portion extending from said pipe-embracing portion and having a branch passage located at a substantial angle to said axis and communicating with said opening, and a sealing member within said branch member forming with said surface a sealing boundary which surrounds said opening, the improvement comprising said sealing boundary diverging from the edge of said opening as it extends from a first pair of points located on said surface at either end of a diameter of said opening which is parallel to said axis, and said surface being a recessed surface in another curved surface, said opening lying in said recessed surface and being surrounded thereby and by said other surface, said recessed surface being joined to said other surface by side walls also surrounding said opening and diverging from the edge of said opening as they extend from a pair of points located at either end of said diameter of said opening, said sealing member being located in said recess along the outer margin of said recessed surface with its outer edge adjacent said side walls, said side walls and said sealing member each have circumferentially extending portions on opposite sides of said opening and axially extending portion on either side of said opening, said recessed surface having extending therefrom a pair of elongated, axially extending ridges located on opposite sides of said opening between said opening and said axially extending portions of said side walls, said axially extending portions of said sealing member being located between said axially extending ridges and said axially extending side walls.

15. In a tapping sleeve according to claim 14, wherein said side walls curve and twist smoothly at the corners joining their circumferentially extending and axially extending side portions.

16. A tapping sleeve according to claim 15, wherein the twist of the side wall in each corner presents said side wall toward another flat plane, including said axis and perpendicular to the axis of said opening, as said side wall extends around said corner from its circumferential portion and wherein the twist of the side wall in each said corner then reverses to at least decrease said presentation as said side wall continues toward its axial portion.

17. A tapping sleeve according to claim 16, wherein the reverse twist of the side wall in each said corner presents said side wall away from said another flat plane as said side wall continues toward its axial portion and wherein each said axial portion is also presented away from said another flat plane throughout at least a major part of the length of said axial portion.

18. In a tapping sleeve, a branch member comprising a pipe-embracing portion with a surface, which is curved about an axis substantially parallel to said embraced pipe, which has an opening therein and which is adapted to embrace a circumferential portion of the periphery of said pipe, and a branch portion having a passage therein extending from said opening at a substantial angle to said axis, a sealing member forming with said surface a sealing boundary surrounding said opening, a back-up member having a surface which is adapted to embrace an opposite circumferential portion of said pipe periphery and which has a circumferentially centrally disposed portion lying opposite said opening in said branch member and extending circumferentially in opposite directions into a pair of pipe supporting circumferentially outer portions on either side of said central portion and means for securing said back-up member to said branch member to clamp said pipe periphery therebetween, the improvement comprising said circumferentially outer pipe supporting surface portions being resilient and yieldable to provide resilient, yielding cushioning surface portions and said centrally disposed surface portion opposite said opening being relieved relative to said cushioning surfaces to accommodate the pipe portion opposite said opening and to concentrate the support of said opposite portion of the pipe periphery by said back-up member at said circumferentially outer cushioning surface portions.

19. A tapping sleeve according to claim 18, said cushioning surfaces converging toward each other as they extend circumferentially toward said centrally disposed portion, to thereby form resilient wedging surfaces between which said pipe periphery is wedged.

20. A tapping sleeve according to claim 18, said cushioning surface portions being provided by a pair of resilient cushion member portions which are supported on a relatively rigid surface of said back-up member and which are separated substantially from each other to form said relief, which extends the axial lengths of said cushion member portions.

21. A tapping sleeve according to claim 20, the portion of said relatively rigid surface of said back-up member underlying said relief also being relieved relative to the portion thereof underlying said cushion member portions.

22. A tapping sleeve according to claim 20, said cushion member portions having substantinally the same uniform thickness.

23. A tapping sleeve according to claim 18, said sealing boundary diverging from said opening as it extends from a pair of points located on said branch member surface at either end of the diameter of said opening which is parallel to said axis.

24. A tapping sleeve according to claim 23, the projection of said sealing boundary on a flat plane parallel to said axis and perpendiular to the axis of said opening being generally the shape of a rectangle.

25. A tapping sleeve according to claim 18, in combination with said pipe.

26. In combination, a main pipe having a side opening and a branch pipe communicating with said pipe opening and located with its axis intersecting the axis of said main pipe at a substantial angle, a tapping sleeve for connecting said branch pipe to said main pipe and comprising a branch member, a sealing member and a back-up member, said branch member having a pipe-embracing portion, which embraces a circumferential portion of said main pipe and which has an opening overlying said side opening, and a branch portion having a branch passage, the axis of which intersects the main pipe axis at a substantial angle, which communicates at one end with said opening and which is sealingly and slidably joined at its other end to an end of said branch pipe, said sealing member surrounding said openings and being sealingly compressed between surfaces of said pipe-embracing portion and said main pipe to form with said surface of said branch member a sealing boundary surrounding said opening of said pipe-embracing portion, said sealing boundary diverging from the edge of said opening of said pipe-embracing portion as it extends from a first pair of points located on said surface at either end of a diameter of said opening which is parallel to said axis of said main pipe, said sealing member being contained within the circumferential edges of said pipe-embracing portion, the projection of the area encompassed by said sealing boundary on a first plane, which is parallel to said main pipe axis and perpendicular to a second plane which contains said branch pipe axis and said main pipe axis, being greater than the projection on said first plane of the area encompassed by the outside diameter of said end of said branch pipe, whereby the force exerted by internal pressure tending to move said branch member away from the main pipe is greater than that tending to move it toward said main pipe, said back-up member embracing the circumferential portion of said pipe opposite said branch member and being secured to said branch member to clamp said pipe therebetween, whereby said greater force tending to move said branch member away from said main pipe urges said back-up member tightly against substantial portions of said pipe periphery which are circumferentially disposed with respect to said openings to thereby provide a counter force against the force of said internal pressure tending to push said portions of said periphery radially outwardly.

27. In combination, a main pipe having a side opening and a branch pipe communication with said pipe opening and located with its axis intersecting the axis of said main pipe at a substantial angle, a tapping sleeve for connecting said branch pipe to said main pipe and comprising a branch member, a sealing member and a back-up member, said branch member having a pipe-embracing portion, which embraces a circumferential portion of said main pipe and which has an opening overlying said side opening, and a branch portion having a branch passage, the axis of which intersects the main pipe axis at a substantial angle, which communicates at one end with said openings and which is sealingly and slidably joined at its other end to an end of said branch pipe, said sealing member surrounding said openings and being sealingly compressed between said pipe-embracing portion and said main pipe to form a sealing boundary surrounding said opening, the projection of the area encompassed by said sealing boundary on a first plane, which is parallel to said main pipe axis and perpendicular to a second plane which contains said branch pipe axis and said main pipe axis, being greater than the projection on said first plane of the area encompassed by the outside diameter of said end of said branch pipe, whereby the force exerted by internal pressure tending to move said branch member away from the main pipe is greater than that tending to move it toward said main pipe, said back-up member embracing the circumferential portion of said pipe opposite said branch member and being secured to said branch member to clamp said pipe therebetween, whereby said greater force tending to move said branch member away from said main pipe urges said back-up member tightly against substantial portions of said pipe periphery which are circumferentially disposed with respect to said openings to thereby provide a counter force against the force of said internal pressure tending to push said portions of said periphery radially outwardly, the axis of said branch pipe being at substantially a right angle to the axis of said main pipe and said first plane being substantially perpendicular to said branch pipe axis, said back-up member having a pipe engaging surface made up of a circumferentially centrally disposed portion which is located opposite said side opening and which extends circumferentially in opposite directions into a pair of pipe supporting circumferentially outer portions on either side of said central portion, said circumferentially outer surface portions being resilient and yieldable, said centrally disposed portion being relieved relative to said resilient and yieldable surfaces to accommodate the pipe portion opposite said opening and to concentrate the support of said pipe by said back-up member at said circumferentially outer resilient and yieldable surfaces, whereby said greater force tending to move said branch member toward said branch pipe wedges said circumferentially outer resilient surface portions tightly against said pipe periphery.

28. A combination according to claim 27, said sealing boundary diverging from said side opening as it extends from a pair of points lying on said main pipe surface at either end of the diameter of said side opening which is parallel to the axis of the main pipe.

29. A combination according to claim 26, the axis of said branch pipe being at substantially a right angle to the axis of said main pipe and said first plane being substantially perpendicular to said branch pipe axis, said back-up member having a pipe engaging surface made up of a circumferentially centrally disposed portion located opposite said side opening and extending circumferentially in opposite directions into a pair of pipe supporting circumferentially outer portions on either side of said central portion, said centrally disposed portion being relieved relative to said circumferentially outer surface portions to accommodate the pipe portion opposite said opening and to concentrate the support of said pipe by said back-up member at said circumferentially outer surface portions, whereby said greater force tending to move said branch member away from said main pipe wedges said circumferentially outer surface portions against said pipe periphery, the axial length of said circumferentially outer surface portions being limited to concentrate the pipe supporting force exerted thereby at the peripheral portions of the pipe circumferentially disposed with respect to said side opening.

30. A combination according to claim 27, said opening in said branch member lying in a curved surface which surrounds said opening and is recessed with respect to another curved surface which also surrounds said opening, said recessed surface and said other surface being joined by side walls which also surround said opening, said sealing member being located along the margin of said recessed surface adjacent said side walls.

References Cited

UNITED STATES PATENTS 3,360,284   12/1967   Ver Nooy _____ 285—197 X
3,433,507   3/1969    Ver Nooy _____ 285—197

DAVID J. WILLIAMOWSKI, Primary Examiner

W. L. SHEDD, Assistant Examiner

U.S. Cl. X.R.
277—9; 285—373, 379